US012737516B2

(12) United States Patent
Liu et al.

(10) Patent No.: US 12,737,516 B2
(45) Date of Patent: Sep. 15, 2026

(54) METHOD AND DEVICE FOR FLOORPLAN GENERATION

(71) Applicant: Tsinghua University, Beijing (CN)

(72) Inventors: Nianxiong Liu, Beijing (CN); Shurui Yan, Beijing (CN); Hang Su, Beijing (CN)

(73) Assignee: Tsinghua University, Beijing (CN)

( * ) Notice: Subject to any disclaimer, the term of this patent is extended or adjusted under 35 U.S.C. 154(b) by 804 days.

(21) Appl. No.: 18/158,375

(22) Filed: Jan. 23, 2023

(65) Prior Publication Data

US 2023/0306165 A1 Sep. 28, 2023

(30) Foreign Application Priority Data

Mar. 23, 2022 (CN) ......................... 202210290430.6

(51) Int. Cl.
*G06F 30/27* (2020.01)
*G06F 30/13* (2020.01)
*G06F 111/06* (2020.01)

(52) U.S. Cl.
CPC .............. *G06F 30/27* (2020.01); *G06F 30/13* (2020.01); *G06F 2111/06* (2020.01)

(58) Field of Classification Search
CPC ...... G06F 30/27; G06F 30/13; G06F 2111/06; G06N 3/006
See application file for complete search history.

(56) References Cited

U.S. PATENT DOCUMENTS

2022/0148327 A1* 5/2022 Fu ........................ G06V 30/147
2022/0207202 A1* 6/2022 Beyhaghi ................ G06F 30/13

OTHER PUBLICATIONS

Keshavarzi, Mohammad, et al. "Optimization and manipulation of contextual mutual spaces for multi-user virtual and augmented reality interaction." 2020 IEEE conference on virtual reality and 3D user interfaces (VR). IEEE, 2020. (Year: 2020).*
Zhang, Jingyu, Nianxiong Liu, and Shanshan Wang. "A parametric approach for performance optimization of residential building design in Beijing." Building Simulation. vol. 13. No. 2. Beijing: Tsinghua University Press, 2020. (Year: 2020).*

* cited by examiner

*Primary Examiner* — Chuen-Meei Gan
(74) *Attorney, Agent, or Firm* — ANOVA LAW GROUP, PLLC

(57) ABSTRACT

A method for residential unit floorplan generation, includes obtaining a current status of a floorplan, performing a plurality of iterations to obtain a plurality of scores until a predetermined number of iterations is reached, and deploying the one or more rooms to be deployed according to a highest score of the plurality of the scores to update the floorplan. In each of the plurality of iterations, the method further includes obtaining room information of one or more rooms to be deployed through a particle swarm algorithm, according to the room information of the one or more rooms to be deployed, performing multiple Monte Carlo tree searches to obtain coordinate information of the one or more rooms to be deployed, and determining one of the plurality of scores of the room information and the coordinate information through an evaluation function.

20 Claims, 13 Drawing Sheets

ROOM FORM QUANTIFICATION:

ROOM RELATIONSHIP GRAPH:

ADJACENT MATRIX:

| | Living room | Bedroom | Dinning | Bathroom | Kitchen | Path | Entrance | Neighbor | Daylighting |
|---|---|---|---|---|---|---|---|---|---|
| Living room | -1 | 0 | 0 | 0 | 1 | 1 | 0 | 0 | 1 |
| Bedroom | 0 | -1 | 0 | 1 | 0 | 1 | 0 | 1 | 1 |
| Dinning | 0 | 0 | -1 | 0 | 0 | 1 | 0 | 1 | 0 |
| Bathroom | 0 | 1 | 1 | -1 | 1 | 1 | 0 | 0 | 0 |
| Kitchen | 1 | 0 | 1 | 1 | -1 | 1 | 0 | 0 | 1 |
| Path | 1 | 1 | 1 | 1 | 1 | -1 | 1 | 0 | 0 |
| Entrance | 0 | 0 | 0 | 0 | 0 | 1 | -1 | 0 | 0 |
| Neighbor | 0 | 1 | 1 | 0 | 0 | 0 | 0 | -1 | 0 |
| Daylighting | 1 | 1 | 0 | 0 | 1 | 0 | 0 | 0 | -1 |

FIG. 7D

METHOD AND DEVICE FOR FLOORPLAN GENERATION

CROSS-REFERENCE TO RELATED APPLICATION

This application claims priority to Chinese Patent Application No. 202210290430.6, filed on Mar. 23, 2022, the entire content of which is incorporated herein by reference.

TECHNICAL FIELD

The present disclosure relates to the field of residential intelligent design and in particular, to a method and device for floorplan generation.

BACKGROUND

Architecture design is a relatively professional and complex work, which usually requires a designer to receive years of professional design training and a certain amount of experience accumulation. The designer needs to combine his/her own professional knowledge and design experience to design a residential unit floorplan. During the design process, the designer needs to sketch manually the layout and shapes of rooms, for example, dining room, living room, bedrooms, bathrooms, in the residential floorplan layout to match the space requirements with the lifestyle. This work depends on the experience of designers. Therefore, a method is needed to generate floorplans automatically providing reference for designers or non-professional.

In recent years, numerous studies have used deep learning to generate residential floorplans.

However, the deep learning training often requires a large amount of data. In a case of limited data, the generalization ability of the model is often affected. Because the model learns the characteristics of the data, the quality of the data determines the effect of the model training to some extent. As for residential units, because there are good and bad floorplans in the real estate market, training based entirely on the floorplans of these units may affect the quality of the generated results. Because different regions often have different requirements for residential design, and relevant design specifications continue to change with time, it is often difficult for models trained based on specific data to adapt to these differences and changes.

Therefore, there is a need for a method to automatically generate the floorplan with aid of a computer for designers, and to explore reasonable floorplans.

SUMMARY

In accordance with the disclosure, there is provided a method for floorplan generation, including obtaining a current status of a floorplan, performing a plurality of iterations to obtain a plurality of scores until a predetermined number of iterations is reached, and deploying the one or more rooms to be deployed according to a highest score of the plurality of the scores to update the floorplan. In each of the plurality of iterations, the method further includes obtaining room information of one or more rooms to be deployed through a particle swarm algorithm, according to the room information of the one or more rooms to be deployed, performing multiple Monte Carlo tree searches to obtain coordinate information of the one or more rooms to be deployed, and determining one of the plurality of scores of the room information and the coordinate information through an evaluation function.

Also in accordance with the disclosure, there is provided a device for floorplan generation, including a memory storing a computer program, and a processor configured to execute the computer program to obtain a current status of a floorplan, perform a plurality of iterations to obtain a plurality of scores until a predetermined number of iterations is reached, and deploy the one or more rooms to be deployed according to a highest score of the plurality of the scores to update the floorplan. In each of the plurality of iterations, the processor is further configured to execute the computer program to obtain room information of one or more rooms to be deployed through a particle swarm algorithm, according to the room information of the one or more rooms to be deployed, perform multiple Monte Carlo tree searches to obtain coordinate information of the one or more rooms to be deployed, and determine one of the plurality of scores of the room information and the coordinate information through an evaluation function.

Also in accordance with the disclosure, there is provided a non-transitory computer-readable storage medium storing a computer program that, when the computer program being executed by a processor, causing the processor to perform obtaining a current status of a floorplan, performing a plurality of iterations to obtain a plurality of scores until a predetermined number of iterations is reached, and deploying the one or more rooms to be deployed according to a highest score of the plurality of the scores to update the floorplan. In each of the plurality of iterations, when the computer program being executed by a processor, causing the processor to further perform obtaining room information of one or more rooms to be deployed through a particle swarm algorithm, according to the room information of the one or more rooms to be deployed, performing multiple Monte Carlo tree searches to obtain coordinate information of the one or more rooms to be deployed, and determining one of the plurality of scores of the room information and the coordinate information through an evaluation function.

BRIEF DESCRIPTION OF THE DRAWINGS

FIGS. 7A-7D are schematic diagrams of representation of the spatial relationship of rooms in the floorplan consistent with the embodiments of the disclosure.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Figure 1:
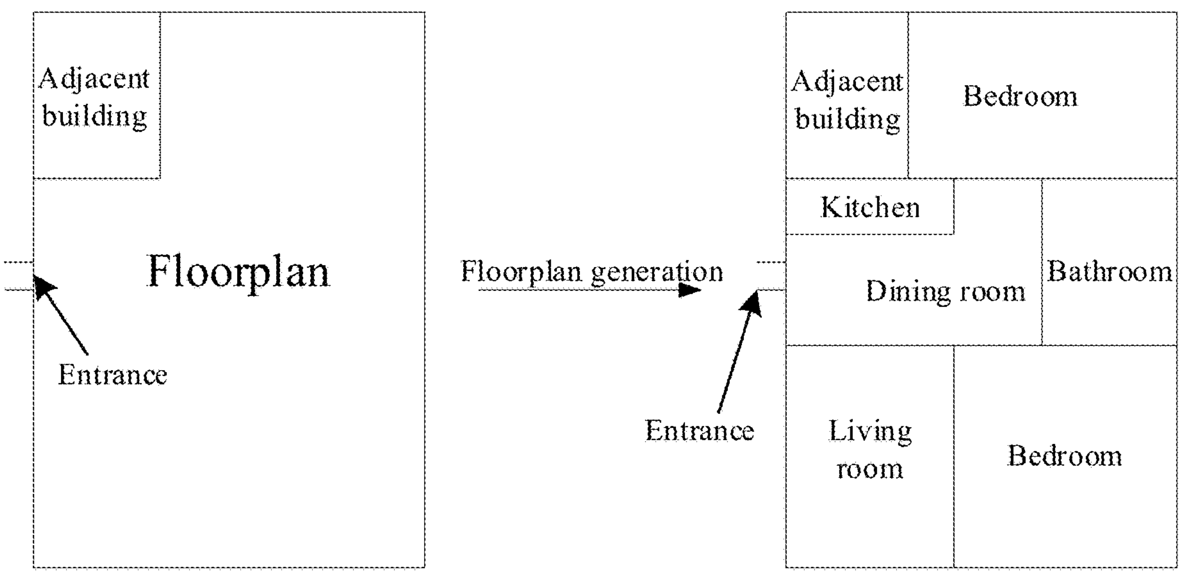
FIG. 1 is a schematic diagram of an application scenario of floorplan generation consistent with the embodiments of the disclosure.

FIG. 1 is a schematic diagram of an application scenario of floorplan generation consistent with the embodiments of the disclosure. As shown in FIG. 1, through the technical solution of the present disclosure, the rooms can be rationally deployed on the floorplan of the existing residential unit. Besides residential unit, it can be understood that the residential house unit can be equivalently replaced by other buildings in various other possible business scenarios, for example, cargo placement, urban design, interior design, strategy games, etc.

Figure 2:
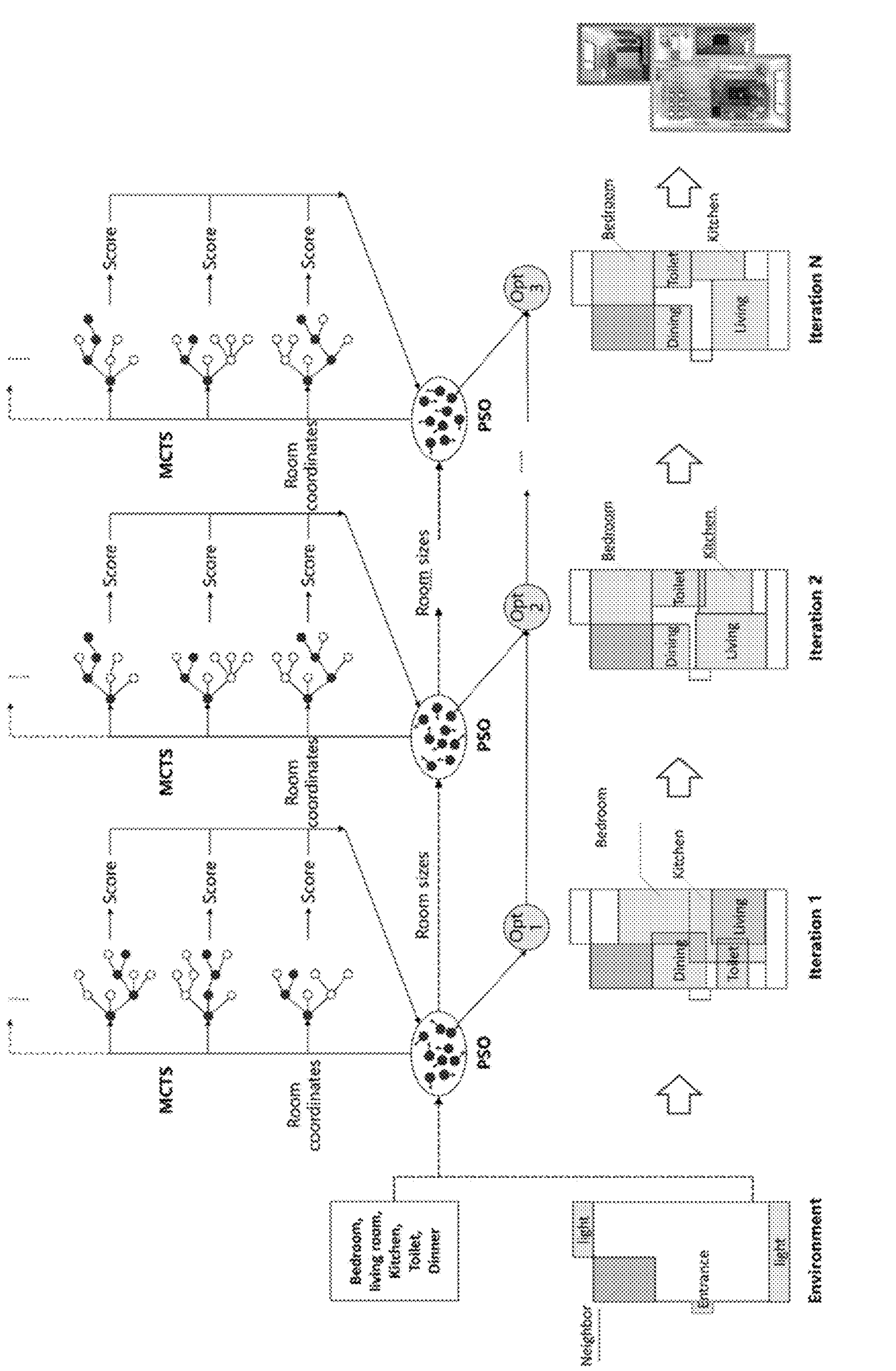
FIG. 2 is a schematic diagram of a floorplan generation process consistent with the embodiments of the disclosure.

FIG. 2 is a schematic diagram of a floorplan generation process consistent with the embodiments of the disclosure. As shown in FIG. 2, under the environmental conditions of a given floorplan, a plurality of rooms to be deployed are combined in an ideal way. The method for floorplan generation consistent with the embodiments of the present disclosure adopts particle swarm optimization (PSO) and Monte-Carlo tree search (MCTS).

The particle swarm optimization (PSO) is a bionic algorithm that simulates birds in a flock of birds through particles. In combinatorial optimization problems, different combinations of variables are regarded as individual particles. The particles have two attributes: a speed and a position. In the iterations, a next position of the particle is updated according to the speed of the particle. Each particle searches for an optimal solution separately in the search space, and records the optimal solution as a current individual extremum, which is shared with other particles in the entire particle swarm. A current global extremum can be obtained by comparison. Each particle adjusts the speed and the position of the particle according to the current individual extremum and the current global extremum shared by the entire particle swarm. Finally, an optimal combination of the variables is obtained through a plurality of iterations. The algorithm of the PSO has characteristics of simplicity, fast convergence speed, and parallel computing.

The Monte-Carlo tree search (MCTS) is used to solve optimal decision problems. Optimal decisions on room placement and size can be achieved through a Monte Carlo tree search. Monte Carlo tree search can be divided into four steps. Selection, extension, simulation, backpropagation. First, in the selection phase, a node N to be expanded needs to be selected downward from the root node. Second, according to the unexpanded actions in node N, create a child node of N in the search tree. Third, in order for the child nodes to get an initial score. It is necessary to start from a child node and let the game proceed randomly until a game ending is obtained, which will be used as the initial score of the child node. Finally, after the simulation of the child node is over, its parent node N and all nodes on the path from the root node to N will update the cumulative weight of each child through the UCT equation according to the results of this simulation. Each iteration expands the search tree, and as the number of iterations increases, the size of the search tree increases. When the number of simulations reaches the set value, the simulation is stopped, and the best child node under the root node is selected as the result of this decision.

As shown in FIG. 2, the generation of the floorplan is completed step by step. First, a size of each room to be deployed in the floorplan is determined through the particle swarm algorithm. Then, coordinates of the room are obtained through the Monte Carlo tree search algorithm. Through multiple iterations, the floorplan is continuously updated, and a final optimized floorplan is obtained.

Figure 3:
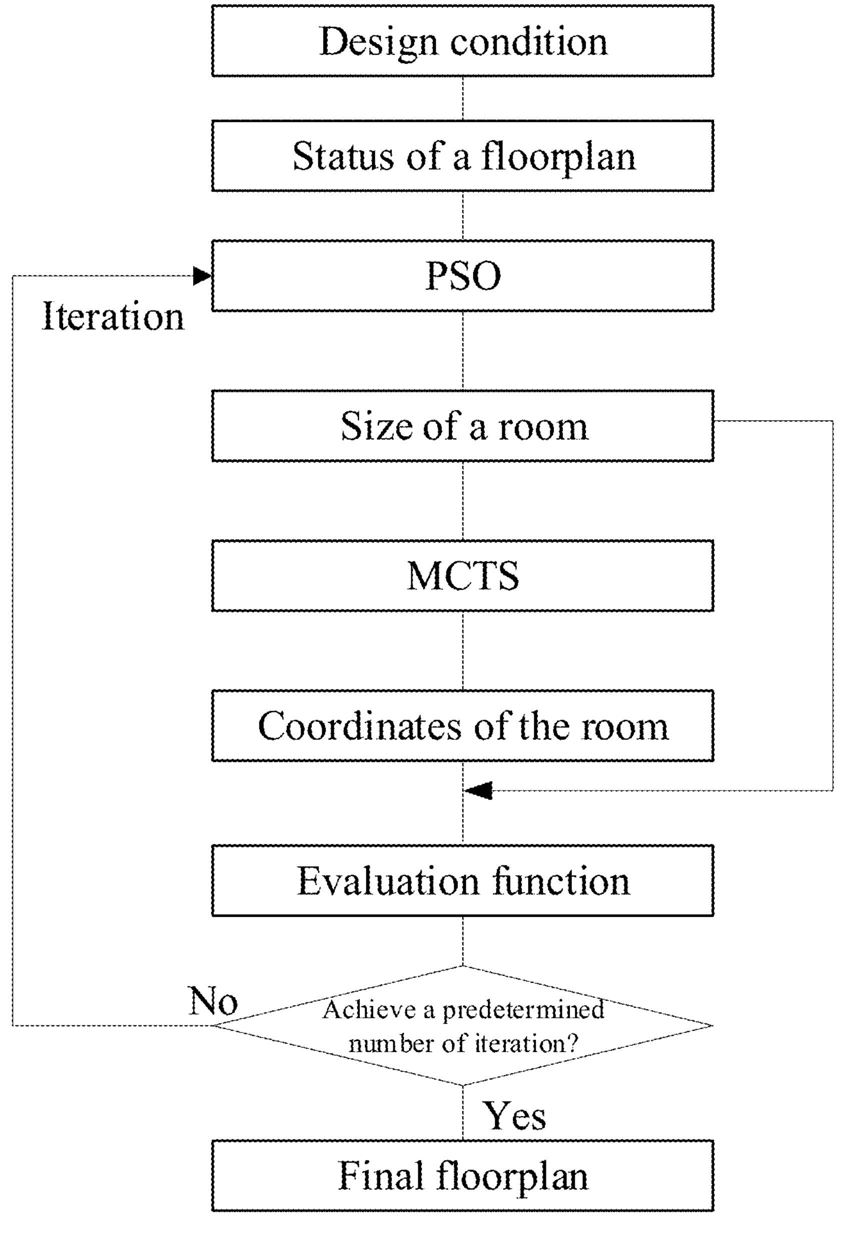
FIG. 3 is a schematic flow chart of a method for floorplan generation consistent with the embodiments of the disclosure.

FIG. 3 is a schematic flow chart of a method for floorplan generation consistent with the embodiments of the disclosure. As shown in FIG. 3, one or more design conditions are firstly determined. The status of the floorplan is determined according to the one or more design conditions of the floorplan. Then, size information of one or more rooms to be deployed is obtained through the PSO algorithm. The coordinates of the one or more rooms to be deployed are obtained through the MCTS algorithm according to the size information of the one or more rooms to be deployed. A score of the size information and the coordinate information is determined through an evaluation function. If a predetermined number of iterations is reached, the one or more rooms to be deployed are deployed according to a highest score of a plurality of scores to get the final floorplan. If the predetermined number of iterations is not reached, a next iteration is performed from obtaining the size information through the PSO algorithm.

Figure 4:
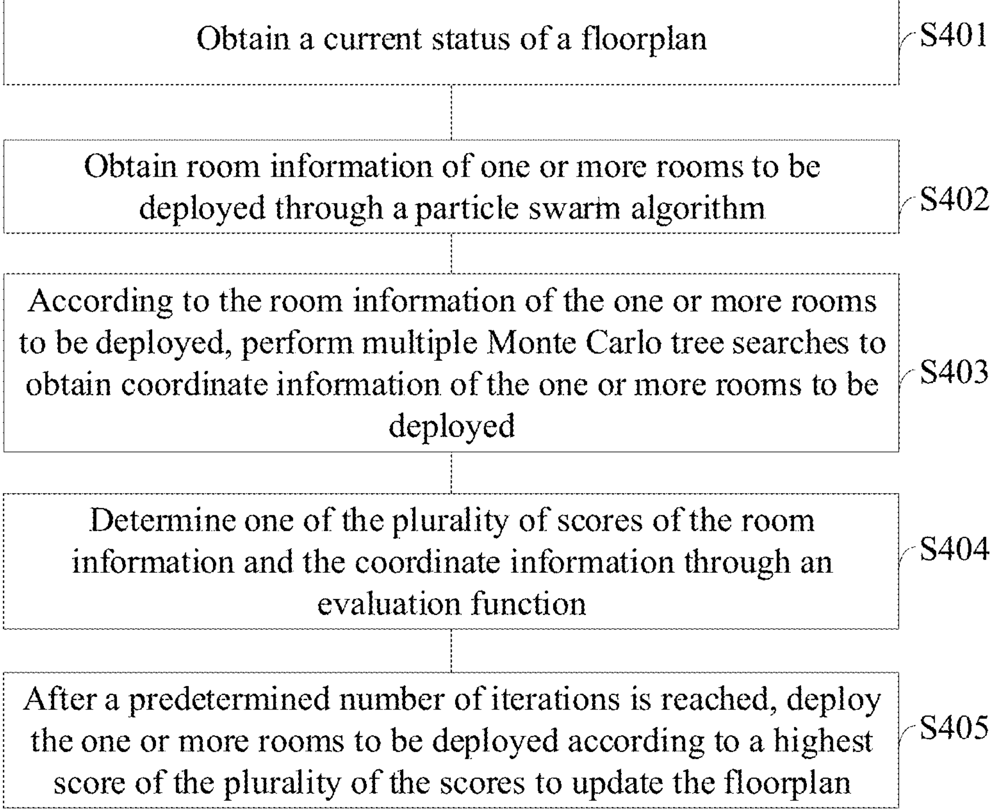
FIG. 4 is a schematic flow chart of the method for the floorplan generation consistent with the embodiments of the disclosure.

FIG. 4 is a schematic flow chart of the method for the floorplan generation consistent with the embodiments of the disclosure. As shown in FIG. 4, the method for the floorplan generation includes the following processes.

At S401, a current status of a floorplan is obtained.

Figure 5A:
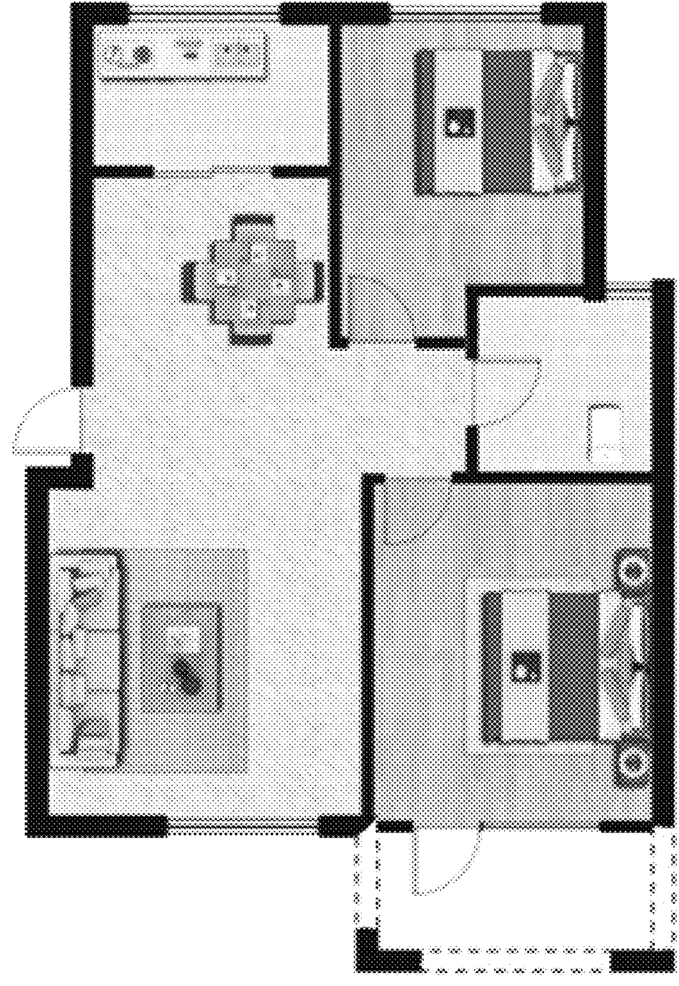
FIGS. 5A-5C are schematic diagrams of a vectorization method of the floorplan consistent with the embodiments of the disclosure.
Figure 5B:
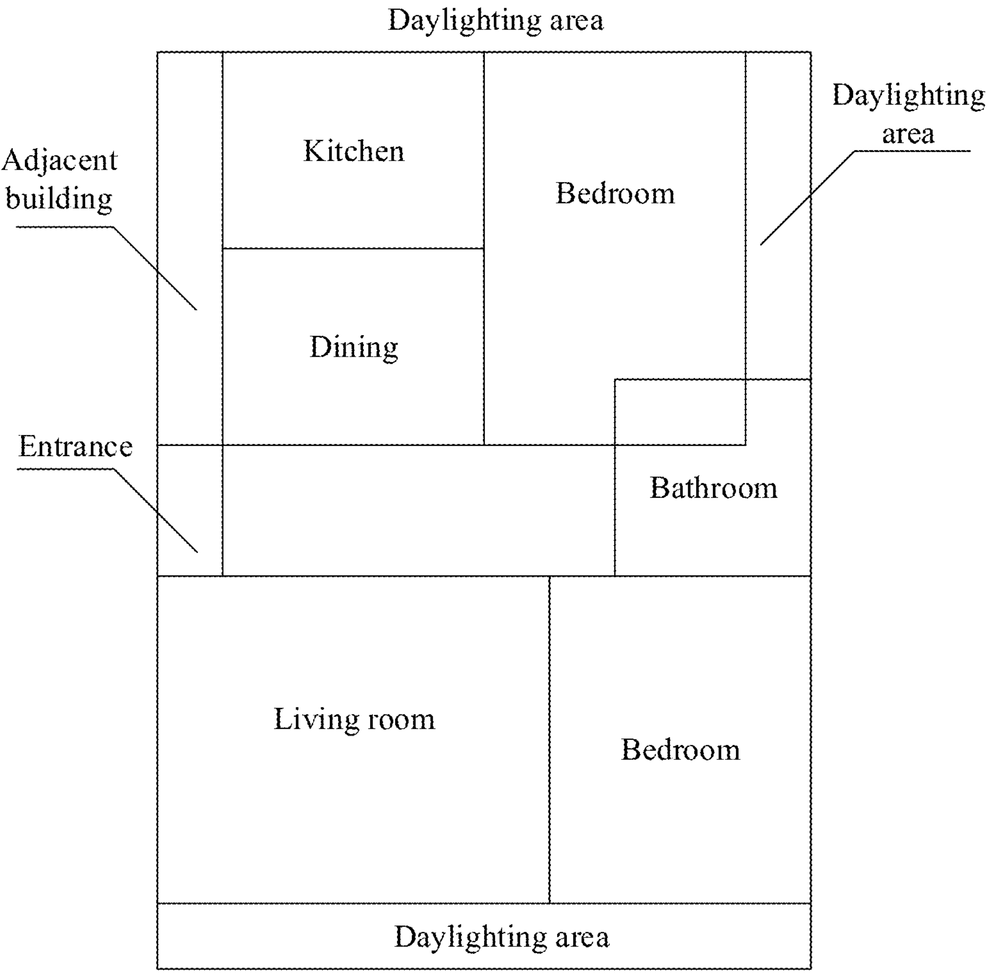
Figure 5C:
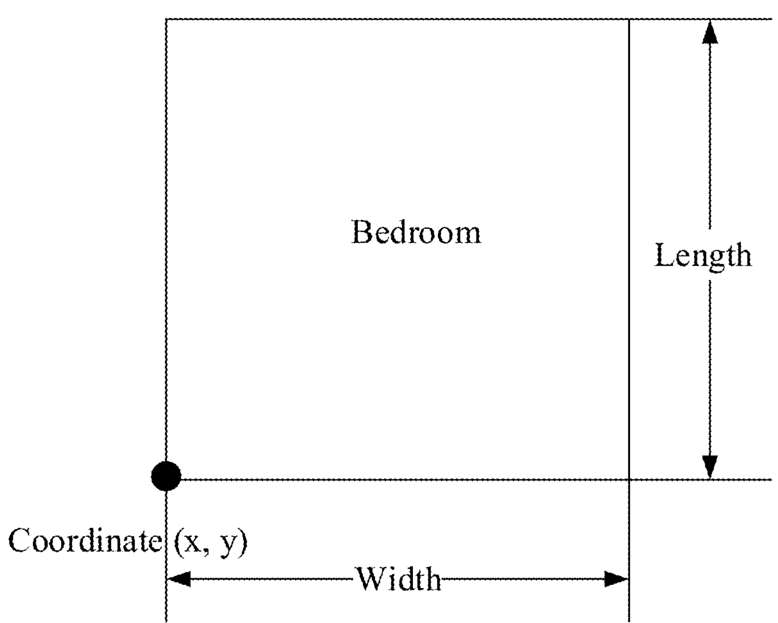
Figure 6:
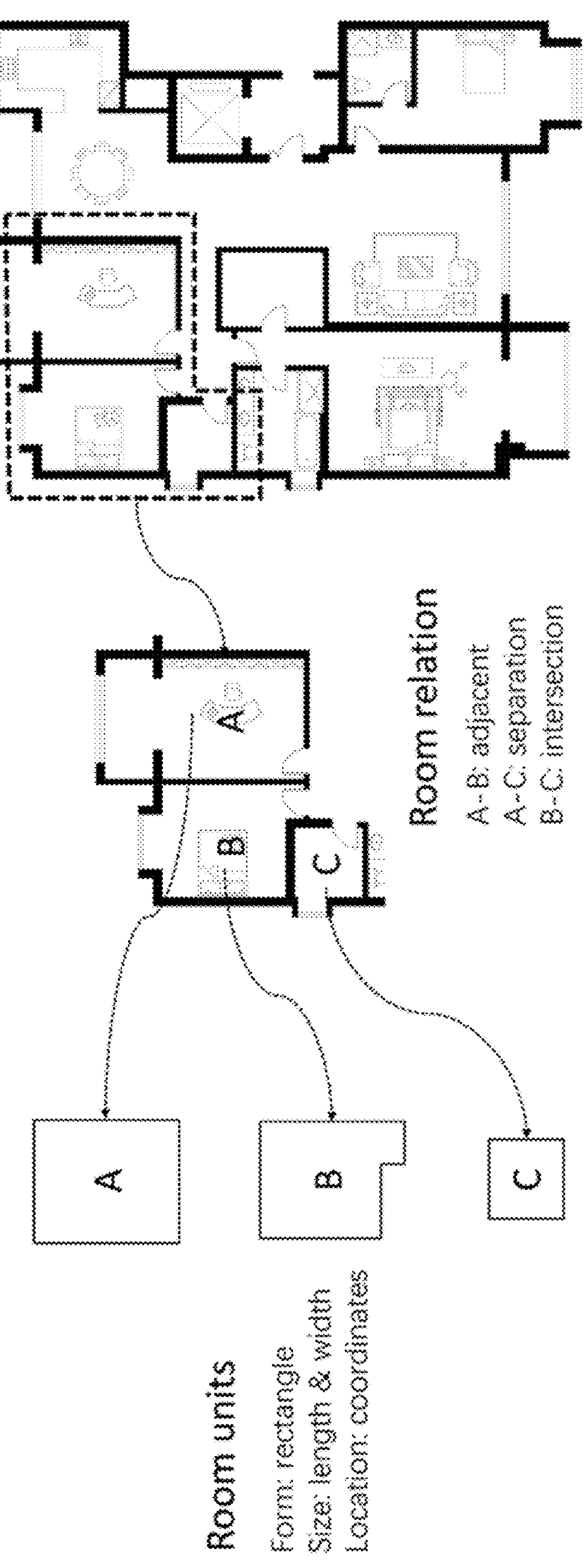
FIG. 6 is a schematic diagram of dismantling the floorplan consistent with the embodiments of the disclosure.
Figure 7A:
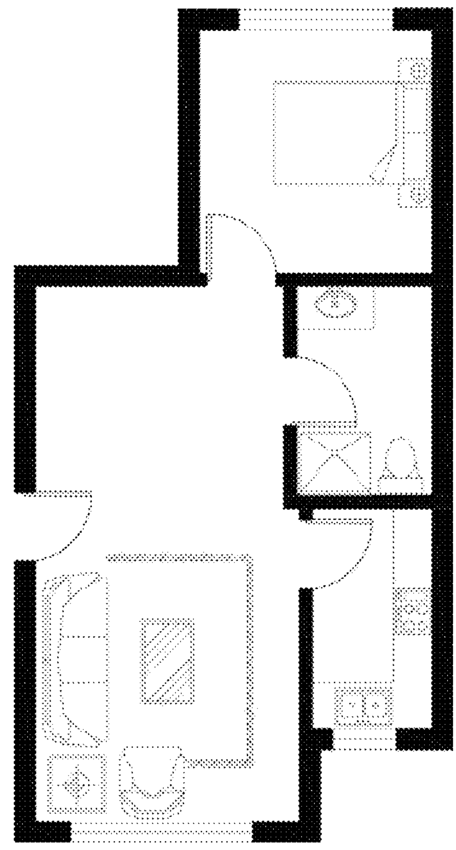
Figure 7B:
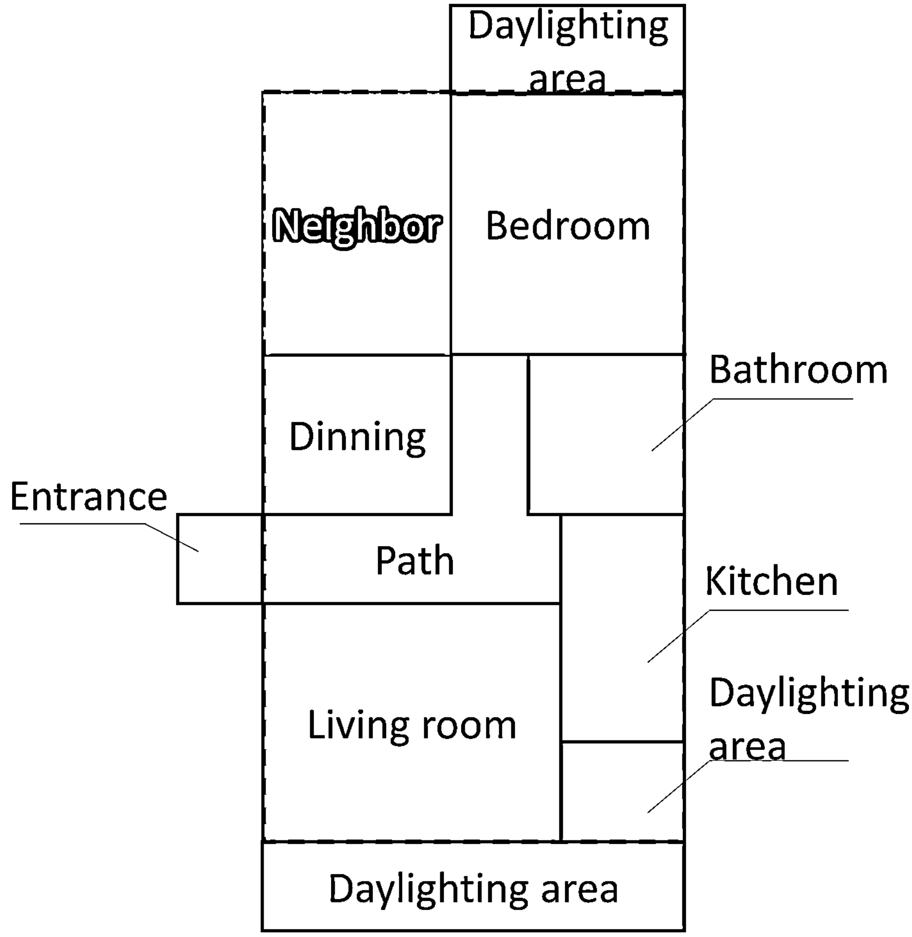
Figure 7C:
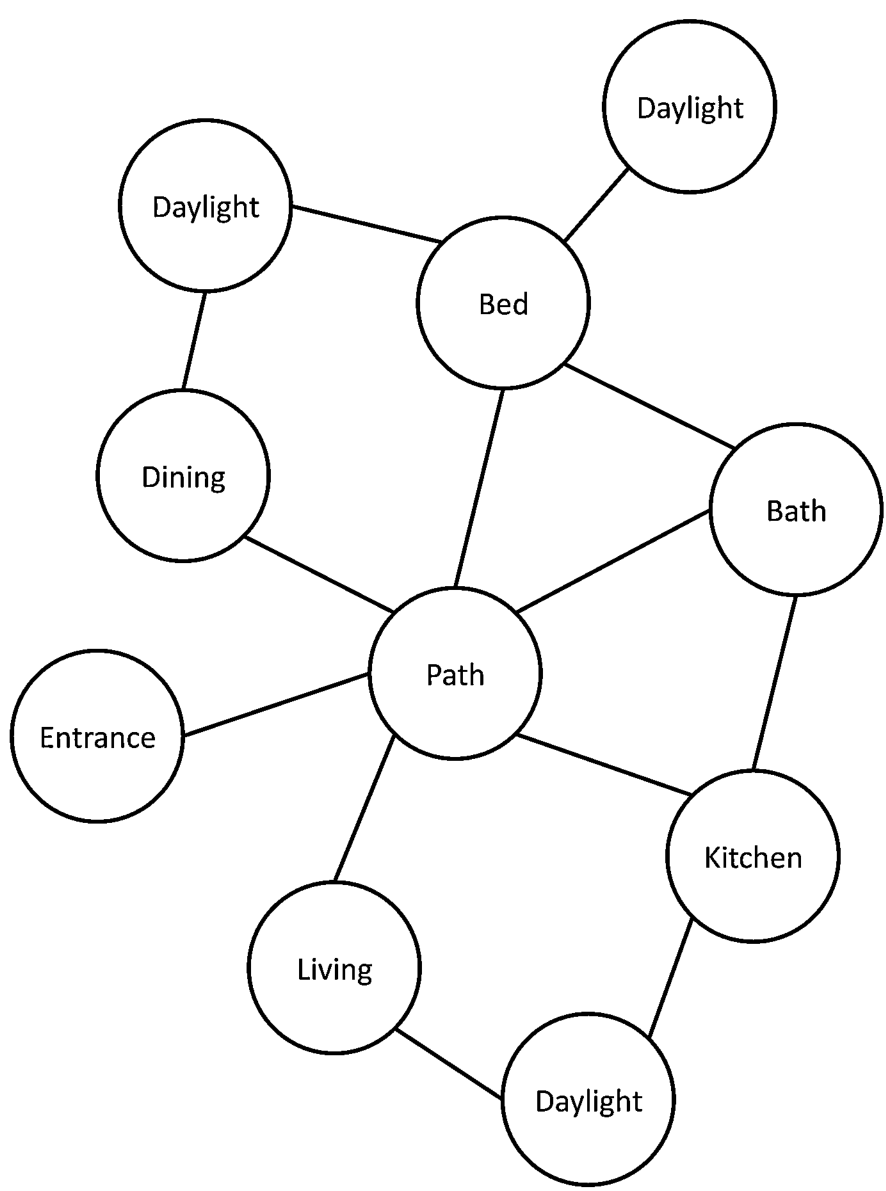

A space unit of a floorplan can be divided into two types: internal rooms and external environment. The internal rooms refer to, except aisles, all closed rooms (such as bedrooms, bathrooms, etc.) and open spaces (such as living rooms, dining rooms, etc.). FIGS. 5A-5C are schematic diagrams of a vectorization method of the floorplan consistent with the embodiments of the disclosure. FIG. 6 is a schematic diagram of dismantling the floorplan consistent with the embodiments of the disclosure. The bold body represents adjacent buildings, and the white body represents the daylighting areas. As shown in FIG. 5A, a room type includes two types: a closed room type, for example, a bedroom, a bathroom, etc., and an open room type, for example, a living room, a dining room, etc. A combination of a plurality of rooms can be abstracted as a combination of a plurality of rectangles. The room information can be described by a size and coordinates. As shown in FIG. 6, most of the rooms are in an "adjacent" relationship. For example, room A is adjacent to room B. Some rooms are in an "intersection" relationship. For example, room B intersects room C. In the intersection relationship, a part of a room "invades" another room. At this time, a plane form of the "invaded" room is a concave polygon, but it can still be regarded as a complete rectangle through a way of filling. Therefore, the combination of all rooms in a floorplan can be regarded as a combination of the plurality of rectangles. According to the abstracted rectangular room, a room form can be quantified. As shown in FIG. 5C, the room form quantification includes room position coordinates and the size of the room. The size of the room includes a length and a width of the room. The size refers to the length and width of the rectangular unit of each room. A too large or too small size for the room is unfavorable for use.

In some embodiments, all room forms are represented by rectangles. Therefore, the entire floorplan can be described using a set of x-axis coordinates, y-axis coordinates, the length dimensions, and the width dimensions Although there are irregular forms in the floorplan of the building, most of the rooms are rectangular. Therefore, representing all the rooms in the floorplan with a rectangle can describe the floorplan for most buildings, simplify calculation difficulty, and achieve a balance between generalization ability and computational efficiency.

In some embodiments, the current status of the floorplan is expressed in a form of a matrix:

$$env \sim \begin{bmatrix} x_{e1}, y_{e1}, w_{e1}, d_{e1} \\ x_{e2}, y_{e2}, w_{e2}, d_{e2} \\ \vdots \\ x_{en}, y_{en}, w_{en}, d_{en} \end{bmatrix}$$

where, env represents a condition matrix of the floorplan, e represents a boundary of the floorplan, x represents an x-axis coordinate, y represents a y-axis coordinate, w represents length information, and d represents width information.

In some embodiments, obtaining the current status of the floorplan includes obtaining a design condition of the floorplan, where the design condition includes a boundary range of the floorplan, a location of a main entrance, a daylighting area, and information of one or more adjacent buildings, and determining the current status of the floorplan according to the design condition.

The external environment of a spatial unit of the floorplan refers to four aspects: the boundary range, the daylighting area, the main entrance, and the adjacent buildings. The floorplan is a combination between room units and a combination between the room units and the external environment (e.g., the boundary of the floorplan).

At S402, room information of the one or more rooms to be deployed is obtained through a particle swarm algorithm. The room information includes size information of each of the one or more rooms to be deployed. The size information of each of the one or more rooms to be deployed includes a length and a width of the each of the one or more rooms to be deployed. Each particle of a particle swarm includes the size information of one of the one or more rooms to be deployed.

A constraint condition of the size of the room often includes a continuous integer interval. There are few constraints, and particles containing the size of the room can be quickly generated by the PSO algorithm.

According to the condition matrix of the floorplan, particles containing the length dimension information and width dimension information of the room to be deployed can be generated. A matrix of the rooms to be deployed includes the room information of the rooms to be deployed. The matrix of the rooms to be deployed can be expressed as:

$$sizes \sim \begin{bmatrix} w_{r1}, d_{r1} \\ w_{r2}, d_{r2} \\ \vdots \\ w_{rn}, d_{rn} \end{bmatrix} = P(env)$$

where, size represents the matrix of the rooms to be deployed, r represents one of the rooms to be deployed, w represents the width information, d represents the length information, P represents the PSO algorithm, and env represents the condition matrix of the floorplan.

In some embodiments, the room information also includes spatial information between rooms in the floorplan. The spatial information between the rooms includes at least one of adjacent, separated, or intersected. The spatial information between the rooms is represented using a room adjacency matrix.

FIGS. 7A-7D are schematic diagrams of representation of the spatial relationship of rooms in the floorplan consistent with the embodiments of the disclosure.

The spatial relationship refers to an adjacent relationship between internal rooms and between internal rooms and the external environment. The original floorplan is planarized into a 2-D floorplan. A room spatial relationship graph is constructed by the spatial relationship of different rooms in the floorplan. The spatial relationship of the rooms is described through the room adjacency matrix. The spatial relationship between the rooms can be summarized as three relationships: separation, adjacency, and intersection.

In some embodiments, obtaining the room information of the one or more rooms to be deployed through the particle swarm algorithm includes obtaining the size information of the one or more rooms to be deployed through a plurality of iterations of a position of a particle, the position of the particle in a j-th iteration being calculated using:

$$x_{i+1} = x_i + \omega v_{i-1} + c_1 \times rand \times \left(pbest_i^j - x_i^j\right) + c_2 \times rand \times (gbest_i - x_i)$$

where, x represents the position of the particle, ω represents an inertia factor, v represents a speed of the particle, $c_1$ and $c_2$ represent learning factors, rand represents a random number uniformly distributed in [0,1), $$pbest_i^j$$

represents a historical best position of a particle i in the j-th iteration, and $gbest_i$ represents a global best position of the particle i in the j-th iteration.

In some embodiments, the size of the room of the floorplan is controlled by modulus, all the sizes of the rooms are multiples of a fixed size unit, so the discrete binary particle swarm algorithm is used to encode the size of the rooms according to discrete integer variables.

Because the particle x is a binary vector, the method for updating the particle iteratively includes bit inversion. The greater the speed of the particle, the greater the gap between the particle and an optimal particle, so a probability of the bit inversion is also greater. On the contrary, the smaller the speed of the particle, the smaller the gap between the particle and the current optimal particle, so the probability of the bit inversion is also smaller.

In some embodiments, an expression of the bit inversion includes:

$$v_i = \omega v_{i-1} + c_1 \times rand \times \left(pbest_i^j - x_i^j\right) + c_2 \times rand \times (gbest_i - x_i)$$

$$s_i^j[k] = \begin{cases} 1 - \dfrac{2}{1 + e^{-v_i^k[k]}}, & v_i^j[k] \le 0 \\ -1 + \dfrac{2}{1 + e^{-v_i^k[k]}}, & v_i^j[k] > 0 \end{cases}$$

-continued $$x_{i+1}^j[k] = \begin{cases} x_i^j[k] \otimes 1, & rand < s_i^j[k] \\ x_i^j[k], & \text{otherwise} \end{cases}$$

where, x represents the position of the particle, ω represents an inertia factor, v represents a speed of the particle, $c_1$ and $c_2$ represent learning factors, rand represents a random number uniformly distributed in [0,1), $$pbest_i^j$$

represents a historical best position of a particle i in the j-th iteration, $gbest_i$ represents a global best position of the particle i in the j-th iteration, k represents the index, $$s_i^j[k]$$

represents a mapping value of the k index position velocity of the particle i in the j-th iteration, and $$x_{i+1}^j[k]$$

represents a value of the k index position of the particle i in the j-th iteration.

At S403, according to the room information of the one or more rooms to be deployed, multiple Monte Carlo tree searches are performed to obtain coordinate information of the one or more rooms to be deployed.

When the size of the room is determined, to eliminate a large number of useless solutions and compress the search space, a more refined screening of the room coordinates is performed. The coordinates is pruned using the MCTS algorithm to take advantage of an accuracy of the tree search. In the MCTS process, the particles generated by the PSO are used as the units to perform parallel calculations to further save time.

When the size of the room is determined, a position for placing the internal room is searched through the MCTS. A room matrix composed of x-axis and y-axis coordinates is obtained and expressed as:

$$coords \sim \begin{bmatrix} x_{r1}, y_{r1} \\ x_{r2}, y_{r2} \\ \vdots \\ x_{rn}, y_{rn} \end{bmatrix} = M(env, sizes)$$

where, coords represents the room matrix, r represents the room, x represents the x-axis coordinate, y represents the y-axis coordinate, M represents the MCTS method, env represents the apartment type condition matrix, and size represents the matrix of the rooms to be deployed.

In some embodiments, according to the current status of the floorplan and the room information of the one or more rooms to be deployed, performing the multiple Monte Carlo tree searches to obtain the search result may include constructing a current search graph according to the current status of the floorplan, where each of a plurality of nodes of the current search graph represents a deployment situation of the room of the one or more rooms to be deployed, determining the room information of the room of the one or more rooms to be deployed, and according to the room information of the room of the one or more rooms to be deployed, performing multiple operations on the current search graph through Monte Carlo tree search algorithm to obtain the search result, the search result including an optimal node of the current search graph.

According to the obtained boundary range of the current floorplan, the location of the main entrance, the daylighting area, and the information of the one or more adjacent buildings, the current status of the floorplan is determined, and the current search graph is constructed according to the current status of the floorplan.

In some embodiments, each of the multiple operations on the current search graph through the Monte Carlo tree search algorithm may include the following processes.

At process A, a node is selected as a root node according to the current search graph, and the root node is expanded according to the root node to obtain a plurality of first sub-nodes. The sub-nodes may refer to child nodes of the root node.

In some embodiments, each of the one or more rooms to be deployed has a size range, such as a length range and a width range. According to coordinates of each of the one or more rooms to be deployed, all combinations of sizes and coordinates are obtained. Each node of the search graph corresponds to a possible deployment situation of one of the one or more rooms to be deployed, that is, each node of the search graph corresponds to a set of a combination of the size and the coordinates. For example, if the room currently to be deployed is a master bedroom, and the current floorplan has not deployed a room, the current status of the floorplan is the root node. The master bedroom is started to be deployed based on the current status of floorplan, and a plurality of floorplans with a plurality of deployment situations of the master bedroom can be obtained. Each of the plurality of floorplans after the master bedroom is deployed is a first sub-node.

At process B, the plurality of first sub-nodes are screened through a pruning method to obtain a plurality of second sub-nodes. The plurality of second sub-nodes represent actual expandable nodes after pruning.

In some embodiments, the pruning method may include a position pruning and a size pruning.

To exclude unnecessary options and compress an exploration space, the search graph of the floorplan is pruned. Pruning can compress the exploration space by excluding one or more obviously inappropriate room forms.

For example, if the current status of the floorplan, that the floorplan has not deployed a room, is selected as the root node, and the root node is expanded, a plurality of floorplans with a plurality of deployment situations of the master bedroom are a plurality of first sub-node. Some of the deployment situations of the master bedroom cannot meet use requirements, therefore the deployment situations that do not meet the use requirements are screened out to obtain a plurality of actual expandable floorplans after the pruning, which are a plurality of second sub-nodes. If one of the plurality of actual expandable floorplans after pruning is selected as the root node, and the root node is expanded, that is, a next room to be deployed, such as a guest bedroom, is deployed, a plurality of floorplans with deployment situations of the guest bedrooms are obtained after the master bedroom is deployed. The plurality of floorplans after the master bedroom is deployed is the first sub-nodes. A plurality of floorplans after the guest bedroom is deployed are pruned to obtain results as the second sub-nodes.

In some embodiments, all room forms are represented by rectangles. Although there are irregular forms in the floorplan of the building, most of the rooms are rectangular. Therefore, representing all the rooms in the floorplan with a rectangle can describe the floorplan for most buildings, simplify calculation difficulty, and achieve a balance between generalization ability and computational efficiency.

The position pruning includes defining a spatial relationship between rooms (such as intersected, adjacent), and pruning according to the spatial relationship. The size pruning includes determining whether an area interval is satisfied, and pruning in response to the area interval being not unsatisfied. The position pruning can eliminate unnecessary coordinates for placing a room. The size pruning can control a size of the room after the position of the room is determined. All feasible deployment situations of a next room in a specific floorplan can be obtained by pruning.

In some embodiments, a formula of the position pruning includes:

$$Set^{i}_{coords} = V_r(x^i_r, y^i_r) \cap V_b(x^i_b, y^i_b)$$

where $$Set^{i}_{coords}$$

represents a set of placeable coordinates for an i-th room, $$V_r(x^i_r, y^i_r)$$

represents a placeable point for a room adjacent to the i-th room, $$V_b(x^i_b, y^i_b)$$

represents placeable point of a remaining area after the i-th room is placed, $$(x^i_r, y^i_r)$$

represents x-axis and y-axis coordinates of the placeable point for the room adjacent to the i-th room, and $$(x^i_b, y^i_b)$$

represents x-axis and y-axis coordinates of the placeable point of the remaining area after the i-th room is placed. The remaining area may refer to a blank area in the floorplan.

Because the spatial relationship between rooms is defined in advance, all deployment situations of the one or more rooms to be deployed with appropriate location information can be obtained through intersection of the remaining area after the room to be deployed is placed and the placeable points of the rooms adjacent to the room to be deployed.

For example, as shown in FIG. 6, it is defined in advance that room B intersects with room C. According to the defined spatial relationship and the intersection of the points of the remaining area of the current floorplan, a plurality of possible deployment situations of room B can be determined.

In some embodiments, a formula of the size pruning includes:

$$\mathrm{Set}^{i}_{rooms} = \mathrm{Set}^{i}_{coords} \times \mathrm{Set}^{i}_{w} \times \mathrm{Set}^{i}_{d}$$

where $$\mathrm{Set}^{i}_{rooms}$$

represents a set of placeable rooms for an i-th room, $$\mathrm{Set}^{i}_{coords}$$

represents a set of placeable coordinates for the i-th room, and $$\mathrm{Set}^{i}_{w}$$

represents a set of width of the i-th room, and $$\mathrm{Set}^{i}_{d}$$

represents a set of depth of the i-th room.

By multiplying the set of coordinates and the set of size of the room to be deployed, the set of placeable rooms with a suitable size for the room to be deployed can be obtained.

At process C, a random search is performed based on the plurality of second sub-nodes, and a result of the random search is evaluated through an evaluation function.

In some embodiments, the evaluation function includes at least one of a room number evaluation, an intersection area evaluation, or an aisle evaluation. The aisle evaluation includes at least one of an aisle area evaluation, an aisle and room adjacency evaluation, or an aisle width evaluation.

Pruning is a strong constraint on the feasible solution of the floorplan, while the evaluation function is a weak constraint on the feasible solution of the floorplan. By scoring each result and updating a weight of each node of the search graph according to the score, the evaluation function can guide the algorithm to explore an optimal strategy.

In some embodiments, a formula of the evaluation function includes:

$$\max\ \mathrm{Score} = S_n + S_o + S_P$$

where, Score represents a total score of the floorplan, $S_n$ represents a score of the number of rooms, $S_o$ represents a score of the intersection area, and $S_p$ represents a score of the aisle.

In some embodiments, a formula of the score of the number of rooms includes:

$$S_n = \frac{n_d}{n_t}$$

where, $n_d$ represents a number of rooms that have been deployed, and $n_t$ represents a total number of rooms planned to be deployed.

In some embodiments, a formula of the score of the intersection area includes:

$$S_o = \frac{\sum_{i=1}^{n} s_r^i - S\left(\bigcup_{i=1}^{n} r_i\right)}{s_b}$$

where, $$\sum_{i=1}^{n} s_r^i$$

represents a total area of all deployed rooms, $$S\left(\bigcup_{i=1}^{n} r_i\right)$$

represents a total area of intersection of all deployed rooms, and $s_b$ represents an area of the boundary range.

In some embodiments, a formula of the score of the aisle includes:

$$S_P = P_o + P_w + P_a$$

where, $P_w$ represents a score of the aisle width, $P_a$ represents a score of the aisle area, and $P_o$ represents a score of the aisle and room adjacency.

In some embodiments, the score of the aisle width is expressed as:

$$P_w = \begin{cases} 1, & w > w_{std} \\ \frac{w_{std} - w}{w_{std}}, & w < w_{std} \end{cases}$$

where, $w_{std}$ represents a minimum target width of the aisle, and w represents a current minimum width of the aisle.

In some embodiments, the score of the aisle area is expressed as:

$$P_a = \begin{cases} 1, & a > a_{std} \\ \frac{a_{std} - a}{a_{std}}, & a < a_{std} \end{cases}$$

where, $a_{std}$ represents a minimum target area of the aisle, and a represents a current minimum area of the aisle.

In some embodiments, the score of the aisle and room adjacency is expressed as:

$$P_d = \sum_{i=1}^{n} d_i$$

where $d_i$ represents a distance from the aisle to the i-th room.

At process D, a weight of a relevant node in the search graph is updated according to the score of the evaluation function. The optimal node includes the node with a largest weight. In some embodiments, the relevant nodes include the plurality of second sub-nodes. The optimal node includes one of the plurality of second sub-nodes with the largest weight. The relevant node refers to the selected node in the expansion process, for example, one of the plurality of second sub-nodes. In some embodiments, only one node is selected in the expansion process for a one-time backpropagation process. In some embodiments, after the Monte Carlo tree search algorithm is repeated continuously until a set number of iterations is reached, a plurality of weights of a plurality of relevant nodes are updated. In some embodiments, the optimal node is determined after a certain number of samplings are performed. If the number of samplings is not enough, the plurality of weights of the plurality of relevant nodes have no statistical significance.

In some embodiments, a formula for updating the weights of the relevant nodes in the search graph includes:

$$W = \frac{\sum_{i=1}^{n} q_j^i}{n_j} + c\sqrt{\frac{2 \times \ln n}{n_j}}$$

where, W represents the weight of one of the plurality of second sub-nodes of the current search graph, $n_j$ represents a number of visit times of the one of the plurality of second sub-nodes, $q_j$ represents the one of the plurality of second sub-nodes, $$q_j^i$$

represents a value of the one of the plurality of second sub-nodes $q_j$ in an i-th simulation, i represents a sequence number of the simulation, n represents a total number of visit times of the root node, and c represents a hyperparameter.

The hyperparameter c is a constant. A theoretical value of the hyperparameter c is $\sqrt{2}$. The larger the value of c, the more inclined to the breadth search. The smaller the value of c, the more inclined to the deep search.

At S404, one of a plurality of scores of the room information and the coordinate information is determined through an evaluation function.

After the one or more rooms to be deployed are deployed, a fitness of the floorplan is calculated through the evaluation function E. Finally, by updating parameters of sizes to maximize the fitness of sizes and coords, the optimal size and coordinate combination sizes*, coords* of the room is obtained and expressed as:

$$sizes^*, coords^* = \arg \max_{size \sim P(env), coords \sim M(env, sizes)} [E(env, sizes, coords)]$$

where, sizes* represents an optimal size combination (matrix), coords* represents an optimal coordinate combination (matrix), arg represents the function, and E represents the evaluation function.

At S405, after a predetermined number of iterations is reached, the one or more rooms to be deployed are deployed according to a highest score of the plurality of scores to update the floorplan.

If the predetermined number of iterations is reached, the one or more rooms to be deployed are deployed according to the highest score of a plurality of scores to obtain the final floorplan. After all the rooms to be deployed are deployed, a final floorplan is output. In some embodiments, the final floorplan may be output (e.g., printed or drawn) on a substance or a medium, such as a paper, a film, a cloth, etc. If the predetermined number of iterations is not reached, a next iteration is performed from obtaining the size information through the PSO algorithm.

Combining the Monte Carlo tree search (MCTS) and the particle swarm algorithm is used for automatic design of residential floorplan, providing design assistance for architects, and also helping non-professionals to realize design intentions or design evaluation. In the process of combinatorial optimization of the rooms in the floorplan, the nodes are pruned through the MCTS algorithm to compress the search space and obtain ideal floorplan while ensuring the generalization ability. By using characteristics of fast convergence and parallel computing of the PSO algorithm, computing time is saved to achieve both effect and efficiency. Experimental results show that the floorplan generated by the PSO-MCTS (i.e., the PSO and the MCTS are embedded in each other) is better than the floorplan generated by the MCTS and the PSO separately, and achieves a better balance in computational efficiency. While ensuring the quality of the generated floorplan, the method consistent with the embodiments of the present disclosure can adapt to diverse design conditions. Compared with a method of deep learning, the method consistent with the embodiments of the present disclosure is not limited by case data but can obtain better results than the case data. Compared with the simple MCTS method, the method consistent with the embodiments of the present disclosure can save calculation time and greatly improve efficiency.

Based on the method for the floorplan generation based on the Monte Carlo tree search consistent with the embodiments of the present disclosure, a device for floorplan generation based on the Monte Carlo tree search is also provided.

Figure 8:
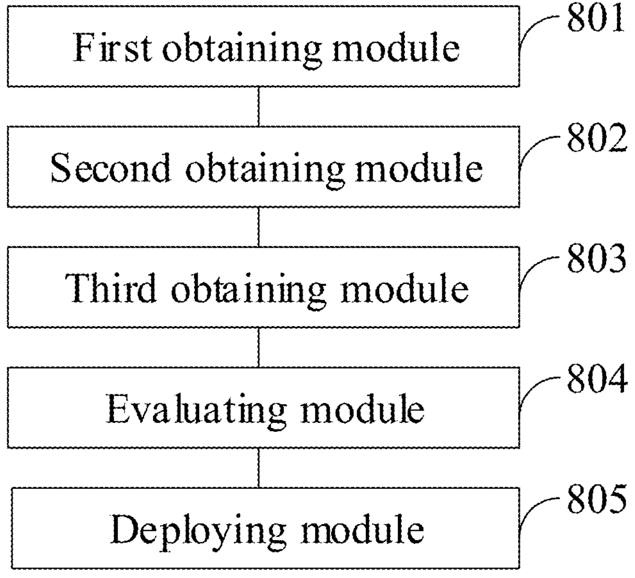
FIG. 8 is a schematic diagram of a device for floorplan generation consistent with the embodiments of the disclosure.

FIG. 8 is a schematic diagram of a device for floorplan generation consistent with the embodiments of the disclosure. The device may be divided into one or more program modules. The one or more program modules are stored in a storage medium, and are processed by one or more processors to execute the method for floorplan generation consistent with the embodiments of the present disclosure. As shown in FIG. 8, the device includes a first obtaining module 801 configured to obtain a current status of a floorplan, a second obtaining module 802 configured to obtain room information of one or more rooms to be deployed through a particle swarm algorithm, where the room information includes size information of the one or more rooms to be deployed, the size information of each of the one or more rooms to be deployed includes a length and a width of the each of the one or more rooms to be deployed, and each particle of a particle swarm represents the size information of one of the one or more rooms to be deployed, a third obtaining module 803 configured to according to the room information of the one or more rooms to be deployed, perform multiple Monte Carlo tree searches to obtain coordinate information of the one or more rooms to be deployed, an evaluating module 804 configured to determine one of a plurality of scores of the room information and the coordinate information through an evaluation function in each of a plurality of iterations, and a deploying module 805 configured to deploy a room of the one or more rooms to be deployed according to a highest score of the plurality of the scores to update the floorplan after a predetermined number of iterations is reached.

Figure 9:
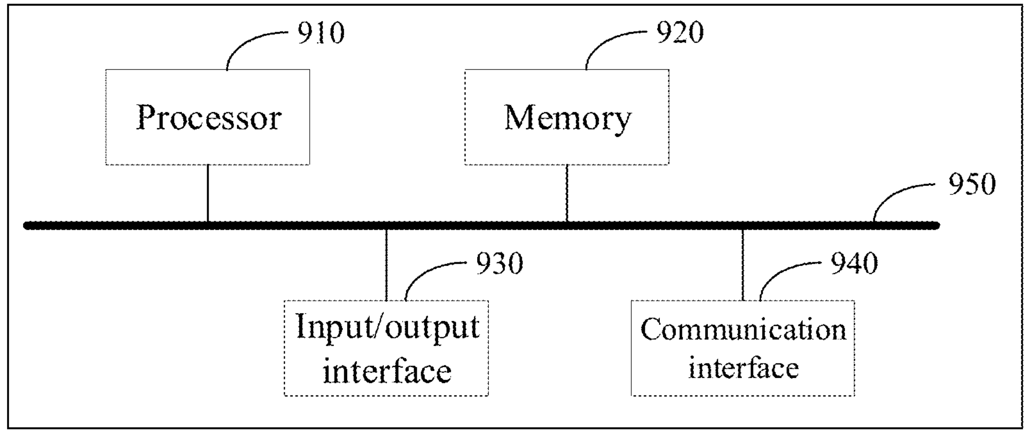
FIG. 9 is a schematic structural diagram of a computer device consistent with the embodiments of the disclosure.

FIG. 9 is a schematic structural diagram of a computer device consistent with the embodiments of the disclosure. As shown in FIG. 9, the computer device includes a processor 910, a memory 920, an input/output interface 930, a communication interface 940, and a bus 950. The processor 910, the memory 920, the input/output interface 930, and the communication interface 940 are connected to each other within the device through the bus 950. The computer device can be used to execute the method for the floorplan generation consistent with the embodiments of the present disclosure.

The processor 910 may be implemented by a general-purpose central processing unit (CPU), a microprocessor, an application-specific integrated circuit (ASIC), or one or more integrated circuits. The processor 910 is configured to execute related programs to perform the method for the floorplan generation consistent with the embodiments of the present disclosure.

The memory 920 may be implemented in a form of a read-only memory (ROM), a random-access memory (RAM), a static storage device, a dynamic storage device, etc. The memory 920 can store operating systems and other application programs. When implementing the technical solutions provided by the embodiments of the present disclosure through software or firmware, the relevant program codes are stored in the memory 920 and executed by the processor 910.

The input/output interface 930 is configured to connect the input/output module to realize information input and output. The input/output module can be configured in the device as a component (not shown), and can also be connected externally to the device to provide corresponding functions. The input device may include a keyboard, a mouse, a touch screen, a microphone, various sensors, etc. The output device may include a display, a speaker, a vibrator, an indicator light, etc.

The communication interface 940 is configured to connect a communication module (not shown), to realize the communication interaction between the device and other devices. The communication module can realize communication through wired means (such as USB, network cable, etc.), and can also realize communication through wireless means (such as mobile network, WIFI, Bluetooth, etc.).

The bus 950 includes a path for transferring information between the various components of the device (e.g., the processor 910, the memory 920, the input/output interface 930, and the communication interface 940).

It should be noted that although the above device only shows the processor 910, the memory 920, the input/output interface 930, the communication interface 940, and the bus 950, the device may also include other components. In addition, those skilled in the art can understand that the above-mentioned device may only include components necessary to implement the technical solutions consistent with the embodiments of the present disclosure, and does not necessarily include all the components shown in the drawings.

The relational terms, such as "first" and "second" are only used to distinguish one entity or operation from another entity or operation, which may not indicate or imply any such actual relationship or order between the entities or operations. The terms "include," "contain," and any other variants are intended to cover non-exclusive inclusion, which cause a process, method, article, or device including a series of elements not only includes the listed elements, but also includes other elements that are not explicitly listed, or elements inherent to the process, method, article, or device. Unless otherwise defined, the use of "including a . . . " followed by an element does not exclude the existence of another same element in the process, method, article, or device.

Those of ordinary skill in the art will appreciate that the example elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A method for automatic designing of residential floorplan generation, comprising:

obtaining a current status of a floorplan;

performing a plurality of iterations to obtain a plurality of scores until a predetermined number of iterations is reached, in each of the plurality of iterations:

obtaining room information of one or more rooms to be deployed through a particle swarm algorithm, the room information including size information of the one or more rooms to be deployed, the size information of each of the one or more rooms to be deployed including a length and a width of the each of the one or more rooms to be deployed, and each particle of a particle swarm representing the size information of one of the one or more rooms to be deployed;

according to the room information of the one or more rooms to be deployed, performing multiple Monte Carlo tree searches to obtain coordinate information of the one or more rooms to be deployed for optimal decisions on room placement, wherein Monte Carlo tree searches further comprise screening deployment situations that do not meet requirements to compress exploration space; and determining one of the plurality of scores of the room information and the coordinate information through an evaluation function; and deploying the one or more rooms to be deployed according to a highest score of the plurality of the scores to update the floorplan.

2. The method of claim 1, wherein obtaining the current status of the floorplan includes:

obtaining a design condition of the floorplan, the design condition including a boundary range of the floorplan, a location of a main entrance, a daylighting area, information of one or more adjacent buildings, or a combination thereof; and determining the current status of the floorplan according to the design condition.

3. The method of claim 1, wherein the room information includes spatial information between rooms in the floorplan, the spatial information between the rooms including at least one of adjacent, separated, or intersected, and the spatial information between the rooms being represented using a room adjacency matrix.

4. The method of claim 1, wherein the current status of the floorplan is expressed in a form of a matrix:

$$env \sim \begin{bmatrix} x_{e1}, y_{e1}, w_{e1}, d_{e1} \\ x_{e2}, y_{e2}, w_{e2}, d_{e2} \\ \vdots \\ x_{en}, y_{en}, w_{en}, d_{en} \end{bmatrix}$$

wherein env represents a condition matrix of the floorplan, e represents a boundary of the floorplan, x represents an x-axis coordinate, y represents a y-axis coordinate, w represents length information, and d represents width information.

5. The method of claim 1, wherein obtaining the room information of the one or more rooms to be deployed through the particle swarm algorithm includes:

obtaining the size information of the one or more rooms to be deployed through a plurality of iterations of a position of a particle, the position of the particle in a j-th iteration being calculated using:

$$x_{i+1} = x_i + \omega v_{i-1} + c_1 \times rand \times \left(pbest_i^j - x_i^j\right) + c_2 \times rand \times (gbest_i - x_i)$$

wherein x represents the position of the particle, w represents an inertia factor, v represents a speed of the particle, $c_1$ and $c_2$ represent learning factors, rand represents a random number uniformly distributed in [0,1), $$pbest_i^j$$

represents a historical vest position of a particle i in the j-th iteration, and $gbest_i$ represents a global best position of the particle i in the j-th iteration.

6. The method of claim 1, wherein according to the room information of the one or more rooms to be deployed, performing the multiple Monte Carlo tree searches includes:

constructing a current search graph according to the current status of the floorplan, each of a plurality of nodes of the current search graph representing a deployment situation of a room of the one or more rooms to be deployed;

determining the room information of the room of the one or more rooms to be deployed; and according to the room information of the room of the one or more rooms to be deployed, performing multiple operations on the current search graph through Monte Carlo tree search algorithm to obtain a search result, the search result including an optimal node of the current search graph.

7. The method of claim 6, wherein each of the multiple operations on the current search graph through the Monte Carlo tree search algorithm includes:

selecting a node as a root node according to the current search graph, and expanding the root node according to the root node to obtain a plurality of first sub-nodes;

screening the plurality of first sub-nodes through a pruning method to obtain a plurality of second sub-nodes, the plurality of second sub-nodes representing actual expandable nodes after pruning;

performing a random search based on the plurality of second sub-nodes, and evaluating a result of the random search through the evaluation function; and updating a weight of one of the plurality of second sub-nodes of the current search graph according to the score of the evaluation function, the optimal node including one of the plurality of second sub-nodes with a largest weight.

8. The method of claim 7, wherein the pruning method includes a position pruning and a size pruning.

9. The method of claim 1, wherein the evaluation function includes at least one of a room number evaluation, an intersection area evaluation, or an aisle evaluation.

10. The method of claim 1, wherein the evaluation function includes an aisle evaluation, the aisle evaluation including at least one of an aisle area evaluation, an aisle and room adjacency evaluation, or an aisle width evaluation.

11. A device for automatic designing of residential floorplan generation, comprising:

a memory storing a computer program; and a processor configured to execute the computer program to:

obtain a current status of a floorplan;

perform a plurality of iterations to obtain a plurality of scores until a predetermined number of iterations is reached, in each of the plurality of iterations:

obtain room information of one or more rooms to be deployed through a particle swarm algorithm, the room information including size information of the one or more rooms to be deployed, the size information of each of the one or more rooms to be deployed including a length and a width of the each of the one or more rooms to be deployed, and each particle of a particle swarm representing the size information of one of the one or more rooms to be deployed;

according to the room information of the one or more rooms to be deployed, perform multiple Monte Carlo tree searches to obtain coordinate information of the one or more rooms to be deployed for optimal decisions on room placement, wherein Monte Carlo tree searches further comprise screening deployment situations that do not meet requirements to compress exploration space; and determine one of the plurality of scores of the room information and the coordinate information through an evaluation function; and deploy the one or more rooms to be deployed according to a highest score of the plurality of the scores to update the floorplan.

12. The device of claim 11, wherein the processor is further configured to execute the computer program to:

obtain a design condition of the floorplan, the design condition including a boundary range of the floorplan, a location of a main entrance, a daylighting area, and information of one or more adjacent buildings; and determine the current status of the floorplan according to the design condition.

13. The device of claim 11, wherein the room information includes spatial information between rooms in the floorplan, the spatial information between the rooms including at least one of adjacent, separated, or intersected, and the spatial information between the rooms being represented using a room adjacency matrix.

14. The device of claim 11, wherein the current status of the floorplan is expressed in a form of a matrix:

$$env \sim \begin{bmatrix} x_{e1}, y_{e1}, w_{e1}, d_{e1} \\ x_{e2}, y_{e2}, w_{e2}, d_{e2} \\ \vdots \\ x_{en}, y_{en}, w_{en}, d_{en} \end{bmatrix}$$

wherein env represents a condition matrix of the floorplan, e represents a boundary of the floorplan, x represents an x-axis coordinate, y represents a y-axis coordinate, w represents length information, and d represents width information.

15. The device of claim 11, wherein the processor is further configured to execute the computer program to:

obtain the size information of the one or more rooms to be deployed through a plurality of iterations of a position of a particle, the position of the particle in a j-th iteration being calculated using:

$$x_{i+1} = x_i + \omega v_{i-1} + c_1 \times rand \times \left(pbest_i^j - x_i^j\right) + c_2 \times rand \times (gbest_i - x_i)$$

wherein x represents the position of the particle, w represents an inertia factor, v represents a speed of the particle, $c_1$ and $c_2$ represent learning factors, rand represents a random number uniformly distributed in [0,1), $$pbest_i^j$$

represents a historical best position of a particle i in the j-th iteration, and $gbest_i$ represents a global best position of the particle i in the j-th iteration.

16. The device of claim 11, wherein the processor is further configured to execute the computer program to:

construct a current search graph according to the current status of the floorplan, each of a plurality of nodes of the current search graph representing a deployment situation of the room of the one or more rooms to be deployed;

determine the room information of the room of the one or more rooms to be deployed; and according to the room information of the room of the one or more rooms to be deployed, perform multiple operations on the current search graph through Monte Carlo tree search algorithm to obtain the search result, the search result including an optimal node of the current search graph.

17. The device of claim 16, wherein the processor is further configured to execute the computer program to:

select a node as a root node according to the current search graph, and expand the root node according to the root node to obtain a plurality of first sub-nodes;

screen the plurality of first sub-nodes through a pruning method to obtain a plurality of second sub-nodes, the plurality of second sub-nodes representing actual expandable nodes after pruning;

perform a random search based on the plurality of second sub-nodes, and evaluate a result of the random search through the evaluation function; and update a weight of one of the plurality of second sub-nodes of the current search graph according to the score of the evaluation function, the optimal node including one of the plurality of second sub-nodes with a largest weight.

18. The device of claim 11, wherein the pruning method includes a position pruning and a size pruning.

19. The device of claim 11, wherein the evaluation function includes at least one of a room number evaluation, an intersection area evaluation, or an aisle evaluation.

20. A non-transitory computer-readable storage medium storing a computer program that, when the computer program being executed by a processor, causing the processor to perform:

obtaining a current status of a floorplan;

performing a plurality of iterations to obtain a plurality of scores until a predetermined number of iterations is reached, in each of the plurality of iterations:

obtaining room information of one or more rooms to be deployed through a particle swarm algorithm, the room information including size information of the one or more rooms to be deployed, the size information of each of the one or more rooms to be deployed including a length and a width of the each of the one or more rooms to be deployed, and each particle of a particle swarm representing the size information of one of the one or more rooms to be deployed;

according to the room information of the one or more rooms to be deployed, performing multiple Monte Carlo tree searches to obtain coordinate information of the one or more rooms to be deployed for optimal decisions on room placement, wherein Monte Carlo tree searches further comprise screening deployment situations that do not meet requirements to compress exploration space; and determining one of the plurality of scores of the room information and the coordinate information through an evaluation function; and deploying the one or more rooms to be deployed according to a highest score of the plurality of the scores to update the floorplan.

* * * * *